May 11, 1948. J. M. SCHORR 2,441,514
PLUG SEAL FOR CONTAINERS
Filed April 19, 1946
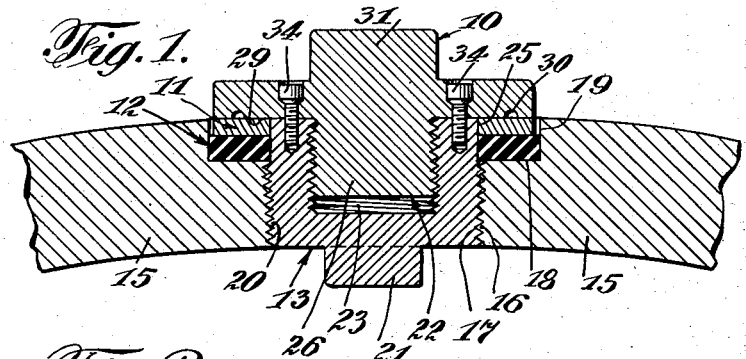
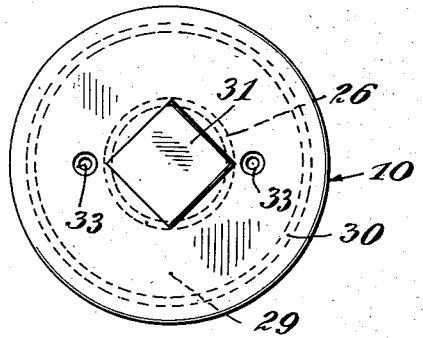
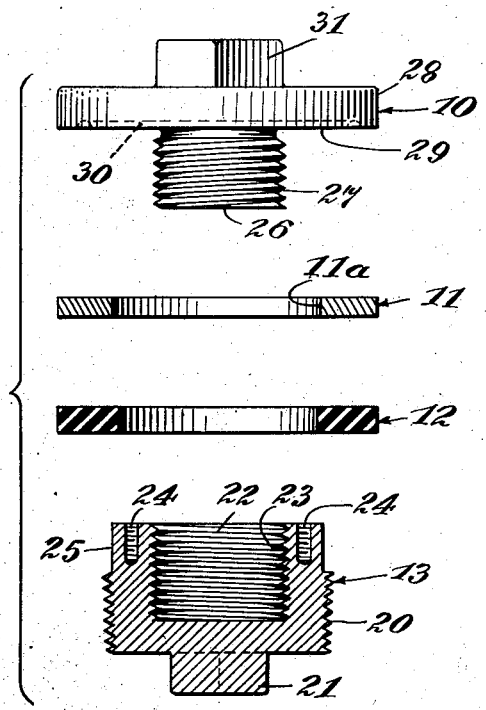
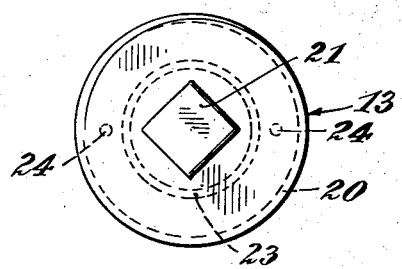
INVENTOR
John Michael Schorr
BY C. P. Goepel
his ATTORNEY Patented May 11, 1948

2,441,514

UNITED STATES PATENT OFFICE 2,441,514

PLUG SEAL FOR CONTAINERS

John Michael Schorr, New Orleans, La.

Application April 19, 1946, Serial No. 663,559

1 Claim. (Cl. 220—39)

This invention relates to plug seals for containers and has for its object to provide a seal for containers having a high vacuum interior. The sealing action is against the exterior atmospheric pressure.

The invention consists in a plug having a circular flange and a screwthreaded plug portion adapted to engage a screwthreaded bore in the container, the container having a table portion and a shoulder portion towards the exterior of the container and beyond its screwthreaded portion, the table and shoulder portions supporting and being engaged by a rubber or similar material washer, huggingly engaging the plug portion, with a brass or similar material washer placed on the outer surface of the rubber washer having a circular opening closely contacting with a cylindrical machined part of the plug, the plug having a flange extending over the upper surface of the brass washer, the opposed surfaces being milled or machined to reduce friction to the greatest extent possible, and thus permitting a freedom of movement, yet providing a sealing action, the pressure of the flange exerting a pressure on the brass washer and upon the rubber washer. The surfaces of the metal parts being highly milled or machined to provide a close fitting is essential.

The invention will be more fully described hereinafter, an embodiment shown in the drawings, and the invention will be finally pointed out in the claim.

In the accompanying drawings,

Fig. 1 is a central section of the improved seal applied to a container;

Fig. 2 is a top view of the upper plug;

Fig. 3 is a side view with parts in section, in exploded positions; and

Fig. 4 is a bottom view of the lower plug.

Similar characters of reference indicate corresponding parts throughout the various views.

Referring to the drawings, and more particularly to Fig. 3, the improved seal for containers subjected to high partial vacuum, consists of four parts, an upper plug 10, a brass washer 11, a rubber washer 12, and a lower plug 13.

The container 15 is provided with a conical bore 16 having its orifice at the interior of the container, the wall of which bore is screwthreaded as at 17. The screwthreaded portion extends about two thirds of the thickness of the wall of the container from the interior to the exterior of the container. The wall of the bore 16 of the container 15 has a circumferential table portion 18 in a plane at right angles to the axis of the bore, and a circumferential shoulder portion 19, at right angles to the table portion 18 extends from the table portion 18 to the exterior wall of the container. The internal diameter of the shoulder portion is larger than the diameter of the bore 16 to the extent of the length of the table portion 18.

The lower plug 13 is slightly conical in shape and has exterior screw threads as at 20, these screwthreads being of a kind to mesh with the screwthreads 17 of the bore 16 of the container wall. The conical bore 16 and the conical plug 13, taper inwardly in the direction from the outside to the inside of the container wall. This permits the entrance of the plug from the outside of the container. A projection 21 of square shape serves for the application of a wrench or other tool. The lower plug 13 has an interior cylindrical bore 22 open at its top, which is interiorly screwthreaded as at 23. It also has circumferentially spaced screwthreaded sockets 24, preferably two in number diametrically disposed for the reception of Allen screws. The exterior screwthreads 20 extend about two thirds up along the lower plug, and the remaining circumferential portion 25 is very closely milled or machined to provide a very smooth surface, which is an important feature.

The rubber washer 12 has an internal diameter, which is about one sixteenth of an inch less than the external diameter of the milled portion 25 of the lower plug 13. The external diameter of the washer 12 is substantially equal to the internal diameter of the shoulder 19 of the container wall. The thickness of the rubber washer 12 is about one half or a little more than one half of the height of the milled portion 25.

The brass washer 11 has a thickness, preferably somewhat less than the thickness of the rubber washer. The combined thicknesses of the rubber and brass washers 12 and 11, is about equal to the height of the milled portion 25.

The brass washer 11 has its upper surface, and particularly its axial wall 11a very closely milled or machined, which is an important feature. The lower surface of the brass washer 11 is preferably knurled to engage the upper surface of the rubber washer 12. Where a certain kind of surface on the rubber washer is used, the engagement between the brass and rubber washers is such that knurling is not necessary. The internal diameter of the wall 11a is substantially equal to the external diameter of the milled portion 25, and excepting for an allowance for tolerance, provides a very close fit.

The upper plug 10 has a cylindrical plug portion 26 exteriorly threaded as at 27, so shaped as to mesh with the interior threads 23 of the lower plug 13. The length of the screwthreaded plug portion 26 is less than the depth of the bore of the lower plug. Above the exterior screwthreaded portion 26, a circular flange 28 of an external diameter substantially equal to the external diameter of the brass washer 11, extends outwardly of the threaded portion 26. The lower surface 29 of this flange 28 is very closely milled to provide a very smooth surface, which is an important feature. The lower surface 29 has a circumferential groove 30 at about one half of the extending length of the flange 28. The outer diameters of the flange 28 and of the brass washer 11 are each slightly less than the internal diameter of the shoulder portion 19 of the container wall. An exterior projection 31 of square shape serves for the application of a wrench or other tool. Screwthreaded sockets 33, with countersunk portions, extend through the flange 29 for the passage of the Allen screws 34 which engage the sockets 24 of the lower plug 13.

To assemble the unit, the brass ring or washer 11 is placed over the milled portion 25 of the lower plug 13. The very close milling provides a snug fit. The upper plug 10 is screwed into the screwthreaded bore 22 of the lower plug 13, as far as it will go, and the Allen screws 34 lock the plugs together. The rubber washer or gasket 12 is then slipped over the threaded part of the lower plug, and pushed up to and under the brass washer or ring 11, with the inner diameter of the rubber washer 12 hugging the milled part 25, the rubber washer being slightly bulged. The upper and lower plugs so combined are ready for use in the steel or other similar container, which has been specially milled to receive the plug. The screwing home of the lower plug portion 13 into the bore 16 of the container presses the rubber, and flattens the bulge and expands it radially against the shoulder 19 of the container as shown in Fig. 1, which shows the external diameter of the rubber larger than the external diameter of the brass ring, though these external diameters were the same, as shown in Figure 3. In so rotating the combined plugs, the smooth surface of the flange 28 rides on the smooth upper surface of brass washer 11, and the oil in the groove 30 facilitates this sliding action, to the end that the brass washer 11 is not rotated, but pressed axially against the rubber washer, the highly machined surfaces of the part 25 and internal bore 11a of the brass washer permitting a free movement axially of the brass washer 11.

The inside diameter of the rubber washer is about one sixteenth of an inch smaller than the milled portion 25 or hub of the lower plug 13, which thereby makes a very close contact and a seal. When the threads 20 of the plug 13, are screwed into the container threads 17, that is, when the combined plug is screwed in, the rubber washer makes a very close contact and seal with the table portion 18 of the container and forms a seal. The pressure on the rubber washer increases, the bulge passes on to the shoulder portion 19 of the container and makes a very close contact and seal, the one thirty-second inch provision insuring such a seal. Finally the brass washer pressing on the rubber, makes a very close contact and seal, while at the same time pressure forces applied to the rubber washer force the rubber against the table 18 and shoulder 19. Thereby, a four point pressure and sealing effect is achieved.

The purpose of the brass surface 29 of the upper plug 10 and brass surface of the brass ring or washer 11 is to provide slippage, when the surface 29 slidingly rotates on the brass ring 11, which may be held by contact with the rubber ring 12. Thereby a uniform pressure on the rubber is provided without dragging the rubber, even though some unevenness or irregularity may be in the table portion 18 of the container. The groove 30 for oil improves the slippage between the milled brass surfaces, the oil film serving while under pressure also as a seal.

It is important that the inside axial wall 11a of the brass ring 11 fits very snugly with only the slightest clearance or tolerance on the hub or milled portion 25 to keep the rubber from oozing out where it would tear, drag the rubber along and break the seal.

While not intended as a limitation, the following dimensions will aid in the making of the improved container seal. The plug portion 26 is ⅝" with a 1" S. A. E. thread, the flange 29 is 2½"; the length of the flange $\frac{5}{16}$". The brass ring is 2½", external diameter, with a 1⅝" opening, a width of $\frac{7}{16}$" and a thickness of ⅛". The rubber ring has an external diameter of 2½", an opening diameter of $1\frac{9}{16}$"; the length of the flange $\frac{15}{32}$", thickness $\frac{3}{16}$". The lower plug has the bore with a 1" S. A. E. thread, the hub or milled portion of a diameter of 1⅝", and an axial length of ⅜", with the axial length of the threaded portion of ⅝" and external threads of 1½" standard pipe thread. The nut portion extends about $\frac{5}{16}$". The external 1½" pipe thread is tapered, that is, the largest diameter is at the upper part of the bore 16. The tap of the wall of the container or steel barrel is tapered to conform. The Allen screws are ¼".

The combined plug with its sealing action is specially intended for use where a very high degree of vacuum in the container is essential.

I have described several forms of my invention, but obviously various changes may be made in the details disclosed without departing from the spirit of the invention as set out in the following claim:

I claim:

In a sealing plug for containers requiring a high vacuum contents, in which the container has a screwthreaded bore, a table portion and a shoulder portion at right angles to the table of a diameter larger than that of the bore, the combination of a plug having an interior screwthreaded bore, and an exterior screwthreaded portion with a machined cylindrical portion without screwthreads, a second plug exteriorly screwthreaded for engaging said interior bore, said second plug having a circular flange with a milled lower surface extending laterally of the cylindrical portion, a metallic washer having an outer diameter substantially that of the outer diameter of said flange, and having a central opening of a diameter equal to the outer diameter of the cylindrical portion of the first plug, allowing for tolerance, and having its upper surface and wall of the opening milled, and a washer of resilient material seated on said table portion, and having a central opening of a diameter less than the outer diameter of the cylindrical portion of the first plug, the outer diameters of the metallic washer and rubber washer being substantially those of the shoulder portion in the container, the first and second plugs being connected by screws for the rotation of both plugs simultaneously, the close fit of the metallic washer and the cylindrical portion providing a seal to the rubber washer and the rubber washer providing a four point seal on the screwing of the combined plug into the bore of the container.

JOHN MICHAEL SCHORR.

REFERENCES CITED

The following references are of record in the file of this patent:

UNITED STATES PATENTS

| Number | Name | Date |
|---|---|---|
| 942,171 | Ecaubert | Dec. 7, 1909 |
| 1,526,375 | Riegel | Feb. 17, 1925 |
| 1,748,665 | Woods | Feb. 25, 1930 |
| 2,154,876 | Thompson | Apr. 18, 1939 |

FOREIGN PATENTS

| Number | Country | Date |
|---|---|---|
| 457,415 | Germany | Mar. 15, 1928 |
| 68,016 | Austria | Feb. 25, 1915 |
| 294,756 | Great Britain | Aug. 2, 1928 |